Patented Feb. 9, 1937

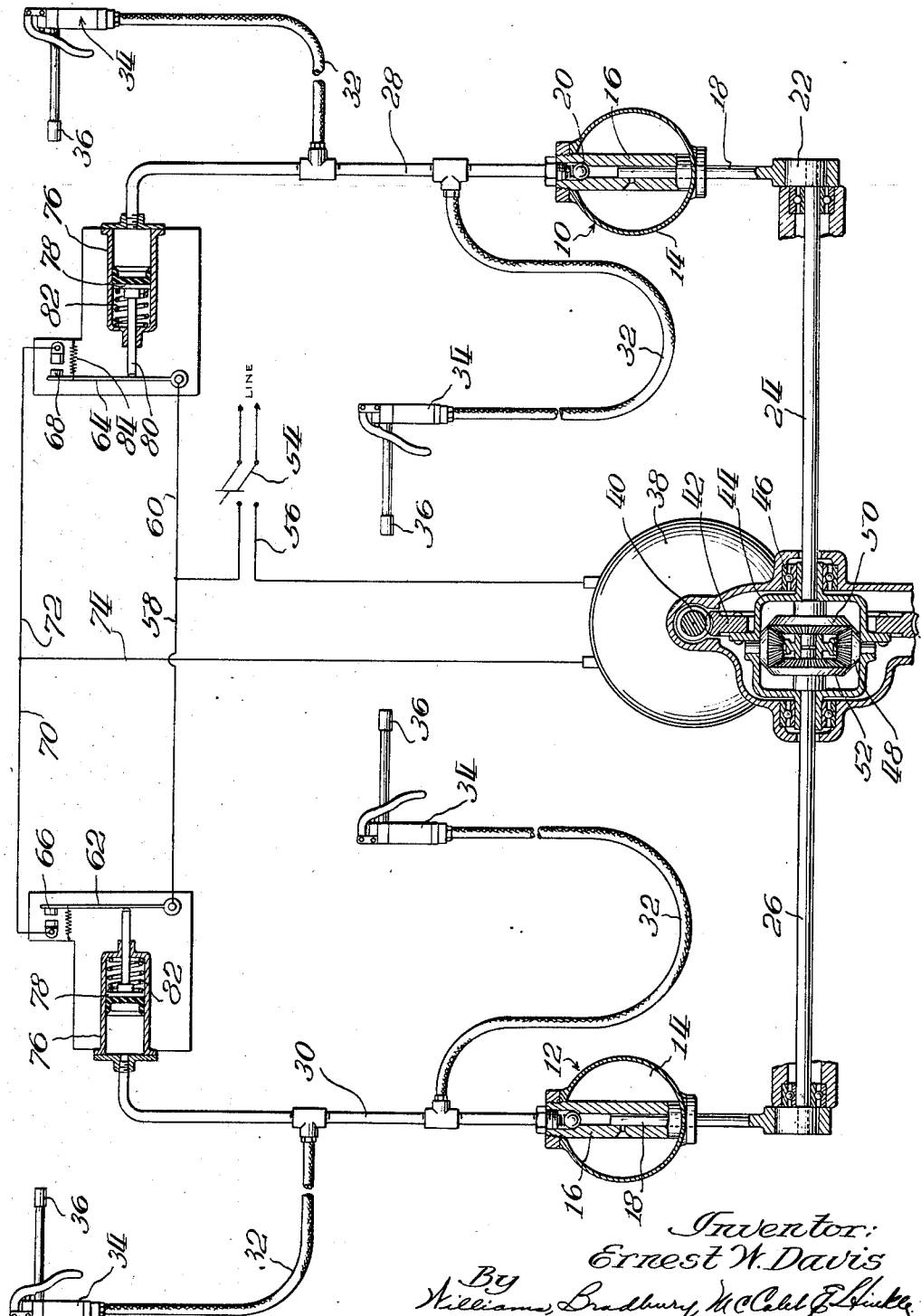

2,070,004

UNITED STATES PATENT OFFICE 2,070,004

LUBRICATING APPARATUS

Ernest W. Davis, Oak Park, Ill., assignor to Stewart-Warner Corporation, Chicago, Ill., a corporation of Virginia Application November 1, 1935, Serial No. 47,764

4 Claims. (Cl. 103—11)

My invention relates generally to lubricating apparatus, and more particularly to installations of lubricant compressors in relatively large service stations, garages, and the like, where a plurality of high pressure lubricant outlets are supplied with lubricant under pressure from two or more lubricant compressors.

It is an object of my invention to provide an improved high pressure lubricant supply installation whereby a plurality of lubricant compressors may be operated by a single motor and the operation of the motor controlled by the pressure of the lubricant in the conduits supplied by each of the compressors.

Other objects will appear from the following description, reference being had to the accompanying drawing, which diagrammatically shows two lubricant compressors operated by a single motor, and illustrates a wiring diagram for the motor.

The invention comprises a pair of compressors 10 and 12, each having a lubricant reservoir 14, a high pressure cylinder 16, a reciprocating plunger 18, and an outlet check valve 20. The plungers 18 are reciprocated by means of cams or eccentrics 22 carried on the ends of shafts 24 and 26 respectively. The lubricant compressors 10 and 12 may be used to supply the same or different kinds of lubricant through high pressure mains 28 and 30 respectively. Suitable discharge conduits 32 are connected to the mains 28 and 30, the flow of the lubricant through these discharge conduits being controlled by manually operated valves 34 which may be of any suitable construction and which are provided with suitable couplers 36 for making a detachable lubricant-tight connection with lubricant receiving fittings attached to bearings to be lubricated. The compressors are operated by an electric motor 38 which through a worm 40 drives a worm wheel 42, the latter being secured to a housing 44 mounted for rotation in suitable bearings 46 and carrying planetary bevel pinions 48. The bevel pinions 48 mesh with a bevel gear 50 secured to the shaft 24 and bevel gear 52 secured to the shaft 26. The motor is thus capable of driving either or both of the shafts 24, 26 through this differential gearing. In the event that the lubricant compressor 10 has built up a high back pressure in its main 28, the motor will drive the compresser 12 at an increased rate and vice versa.

Current is supplied to the motor from a suitable source connected to the switch 54. One pole of the switch 54 is connected by a conductor 56 to a terminal of the motor. The other pole of the switch is connected by wires 58 and 60 to contact arms 62 and 64 of pressure controlled switches 66 and 68 respectively. The other contacts of the pressure controlled switches 66, 68 are connected by conductors 70, 72, and 74 with the other terminal of the motor 38. From this diagram it will be seen that the pressure controlled switches 66 and 68 are connected in parallel in the circuit supplying current to the motor. Each of the pressure controlled switches 66, 68 comprises a cylinder 76 connected to the pressure main 28, 30, and has a piston 78 reciprocable in the cylinder. The piston 78 has a piston rod 80 extending outwardly from the cylinder and the piston is normally urged against the pressure of the lubricant in the main by a compression coil spring 82 which may if desired be adjustably mounted so as to make it possible to vary its compression. The piston stem 80 engages the contact arm 62, 64 of the contact switch and moves the latter against the tension of a spring 84. It will be understood that the constructions disclosed in this application are merely diagrammatic and illustrate but one operative form of my invention.

Assuming that the switch 54 has been closed to supply current to the motor and that the pressure in both mains 28 and 30 is below the maximum pressure predetermined by the degree of compression of the springs 82 in the pressure controlled switches, the motor 38 will commence operating and drive both compressors 10 and 12, gradually building up the pressure in the mains 28 and 30 to the predetermined maximum pressure. Should the lubricant from one of the compressors be used more rapidly than that of the other, the latter compressor will build up the pressure in its main to the predetermined maximum pressure and open its pressure controlled switch 66 or 68. The compressor operating against the high pressure in its main will of course require a higher torque to operate it, and this increased torque will be reflected to its beveled gear 50 or 52 so that the other of these bevel gears will be driven more rapidly because of the differential gear drive. When the pressure in both mains 28, 30 has been built up to the predetermined maximum pressure, both pressure controlled switches 66, 68 will be open and the supply of current to the motor 38 interrupted. As soon as some lubricant is dispensed from one of the discharge conduits 32, and the pressure in the main to which such conduit is connected is thus reduced, the pressure controlled switch connected to this main will close and restart the motor 38.

It will thus be seen that with a single motor I can efficiently drive two lubricant compressors. The cost of the installation may be decreased with a gain in the efficiency of the installation as a whole. Since lubricant is dispensed intermittently from the two mains, the motor will seldom have to drive both of the compressors simultaneously. Thus, except upon the chance occasions when lubricant is being dispensed simultaneously from both mains, the full power of the motor will be available to drive one of the compressors and enable it rapidly to build up the pressure in its discharge main to the predetermined maximum pressure.

While I have illustrated and described a preferred embodiment of my invention, many modifications may be made without departing from the spirit of the invention, and I do not wish to be limited to the precise details set forth but desire to avail myself of all changes within the scope of the appended claims.

Having thus described my invention, what I claim as new and desire to secure by Letters Patent of the United States, is:

1. In a lubricant supply installation for lubricating service stations and the like, the combination of a plurality of lubricant compressors, an electric motor, a differential driving connection between said motor and said compressors, a pressure controlled switch responsive to the pressure in the discharge line of each of said compressors, and conductors connecting said switches in parallel with said motor, whereby said motor will operate until the pressure in both of the discharge mains of said compressors attains a predetermined maximum.

2. In combination, a plurality of lubricant compressors, a motor, a differential driving connection between said motor and said compressors, pressure controlled elements responsive to the pressure in the discharge lines of said compressors respectively, and means operated by said elements effective to control the operation of said motor, whereby said motor will operate until the pressure in the discharge mains of said compressors attains a predetermined maximum.

3. In combination, a plurality of lubricant compressors, a motor, a source of power for said motor, a differential driving connection between said motor and said compressors, a pressure controlled element responsive to the pressure in the discharge line of each of said compressors, and means controlled by said elements effective to control the supply of power to said motor, whereby said motor will be supplied with power until the pressures in both discharge mains of said compressors attain predetermined maximum values.

4. In a lubricant supply installation for lubricating service stations and the like, the combination of a plurality of lubricant compressors, discharge mains connected to said compressors respectively, each of said mains having a valve controlled outlet, an electric motor, a differential driving connection between said motor and said compressors, pressure controlled switches responsive to the pressure in said discharge mains respectively, and parallel circuits each including one of said switches and connecting said motor to a source of current, whereby said motor will operate until the pressure in both of said discharge mains attains a predetermined maximum value and will recommence operation to drive either of said compressors when lubricant is dispensed from one of said outlets.

ERNEST W. DAVIS.